US009028292B2

(12) United States Patent
Benecke et al.

(10) Patent No.: US 9,028,292 B2
(45) Date of Patent: May 12, 2015

(54) FLEXIBLE TOY FIGURE WITH ARMATURE

(75) Inventors: Bill Benecke, Los Angeles, CA (US); Steed Sun, San Marino, CA (US); Thai Cheng Chen, Cerritos, CA (US)

(73) Assignee: Mattel, Inc., El Segundo, CA (US)

( * ) Notice: Subject to any disclaimer, the term of this patent is extended or adjusted under 35 U.S.C. 154(b) by 142 days.

(21) Appl. No.: 13/554,221

(22) Filed: Jul. 20, 2012

(65) Prior Publication Data

US 2013/0052911 A1 Feb. 28, 2013

Related U.S. Application Data

(60) Provisional application No. 61/510,032, filed on Jul. 20, 2011.

(51) Int. Cl.
*A63H 3/36* (2006.01)
*A63H 9/00* (2006.01)
*A63H 3/16* (2006.01)
*B29C 47/00* (2006.01)
*B29C 69/00* (2006.01)

(52) U.S. Cl.
CPC .............. *A63H 9/00* (2013.01); *Y10T 29/4984* (2015.01); *A63H 3/16* (2013.01); *B29C 69/00* (2013.01); *B29C 47/0042* (2013.01)

(58) Field of Classification Search
CPC ........ A63H 3/16; A63H 9/00; B29C 47/0042; B29C 69/00; Y10T 29/4984
USPC ............... 446/375, 72, 98, 100, 101
See application file for complete search history.

(56) References Cited

U.S. PATENT DOCUMENTS

| 164,582 | A | 6/1875 | Miller |
| 280,986 | A | 7/1883 | Wishard |
| 1,189,585 | A | 7/1916 | Kruse |
| 1,347,993 | A | 7/1920 | Dawley |
| 1,551,250 | A | 8/1925 | Henry et al. |
| 1,590,898 | A | 6/1926 | McAuley |
| 1,595,203 | A | 8/1926 | Leathers |
| 1,626,533 | A | 4/1927 | Hergershausen |

(Continued)

FOREIGN PATENT DOCUMENTS

| CN | 2203623 | 7/1995 |
| CN | 2724794 | 9/2005 |

(Continued)

OTHER PUBLICATIONS

Intellectual Property Office, Combined Search and Examination Report Under Sections 17 and 18(3), Sep. 24, 2012, 6 pages.

(Continued)

*Primary Examiner* — Vishu Mendiratta
(74) *Attorney, Agent, or Firm* — Kolisch Hartwell, PC

(57) ABSTRACT

A toy figure is provided that incorporates an articulated armature, the armature including a torso member and multiple limbs, where each limb may be the same or different, and each limb includes at least one limb segment. Each limb segment includes two longitudinal primary plates that intersect approximately orthogonally, and a plurality of substantially parallel secondary plates that intersect with and are approximately orthogonal to both primary plates. The outer edges of the primary and secondary plates of each limb segment substantially define a shape and a volume for that limb portion of the toy figure. The articulated armature is surrounded by a resilient body material to simulate flesh.

14 Claims, 4 Drawing Sheets

(56) References Cited

U.S. PATENT DOCUMENTS

| | | | |
|---|---|---|---|
| 2,017,023 A | 10/1935 | Rendle et al. | |
| 2,073,723 A | 3/1937 | Woolnough et al. | |
| 2,109,422 A | 2/1938 | Haughton et al. | |
| 2,129,421 A | 9/1938 | Hales | |
| 2,134,974 A | 11/1938 | Hurwitz et al. | |
| 2,174,932 A | 10/1939 | Weis et al. | |
| 2,202,805 A | 5/1940 | Wood | |
| 2,392,024 A | 1/1946 | Couri | |
| 2,601,740 A | 7/1952 | Schippert | |
| 2,669,063 A | 2/1954 | Lang et al. | |
| 2,684,503 A | 7/1954 | Silver | |
| 2,706,357 A * | 4/1955 | Nigh et al. | 43/3 |
| 3,055,119 A | 9/1962 | Mcewen et al. | |
| 3,265,257 A | 8/1966 | Buonamici | |
| 3,277,601 A | 10/1966 | Ryan | |
| 3,284,947 A | 11/1966 | Dahl | |
| 3,325,939 A | 6/1967 | Ryan et al. | |
| 3,350,812 A | 11/1967 | Lindsay et al. | |
| 3,394,490 A | 7/1968 | Baxter | |
| 3,395,484 A | 8/1968 | Smith | |
| 3,555,723 A | 1/1971 | Kopsch et al. | |
| 3,557,471 A | 1/1971 | Payne et al. | |
| 3,624,691 A | 11/1971 | Robson et al. | |
| 3,628,282 A | 12/1971 | Johnson et al. | |
| 3,699,714 A | 10/1972 | Johnson et al. | |
| 3,706,330 A | 12/1972 | Rightmire et al. | |
| 3,716,942 A | 2/1973 | Garcia et al. | |
| 3,731,426 A | 5/1973 | Lewis et al. | |
| 3,837,008 A | 9/1974 | Bahler et al. | |
| 3,955,309 A | 5/1976 | Noble | |
| 4,123,872 A | 11/1978 | Silva | |
| 4,136,484 A | 1/1979 | Abrams | |
| 4,197,358 A | 4/1980 | Garcia | |
| 4,233,775 A | 11/1980 | Neufeld | |
| 4,279,099 A | 7/1981 | Dyer et al. | |
| 4,470,784 A | 9/1984 | Piotrovsky | |
| 4,570,936 A * | 2/1986 | Meiser et al. | 273/157 R |
| 4,738,647 A | 4/1988 | Renger et al. | |
| 4,932,919 A | 6/1990 | Shapero | |
| 4,954,118 A | 9/1990 | Refabert | |
| 4,964,836 A | 10/1990 | Kamei | |
| 4,968,282 A | 11/1990 | Robson et al. | |
| 5,017,173 A | 5/1991 | Shapero et al. | |
| 5,257,873 A | 11/1993 | Abbat | |
| 5,297,443 A | 3/1994 | Wentz | |
| 5,474,485 A | 12/1995 | Smrt | |
| 5,516,314 A | 5/1996 | Anderson | |
| D374,905 S * | 10/1996 | Szolis | D22/125 |
| 5,572,824 A * | 11/1996 | Szolis | 43/3 |
| 5,620,352 A | 4/1997 | Tzong | |
| 5,630,745 A | 5/1997 | Yeh | |
| 5,664,983 A | 9/1997 | Hollis | |
| 5,762,531 A | 6/1998 | Witkin | |
| 5,800,242 A | 9/1998 | Clokey | |
| 5,800,243 A | 9/1998 | Berman | |
| 5,989,658 A | 11/1999 | Miura et al. | |
| 6,074,270 A | 6/2000 | Wilcox et al. | |
| 6,110,002 A | 8/2000 | Langton | |
| 6,126,509 A | 10/2000 | Berman | |
| 6,139,328 A | 10/2000 | Picotte | |
| 6,155,904 A | 12/2000 | Spector | |
| 6,170,721 B1 | 1/2001 | Chen | |
| 6,217,406 B1 | 4/2001 | Ross | |
| 6,220,922 B1 | 4/2001 | Lee et al. | |
| 6,494,763 B1 | 12/2002 | Hastey | |
| 6,537,130 B1 | 3/2003 | Lee et al. | |
| 6,607,684 B1 | 8/2003 | Lee et al. | |
| 6,626,732 B1 * | 9/2003 | Chung | 446/387 |
| 6,685,533 B1 | 2/2004 | Lee | |
| 6,746,303 B2 | 6/2004 | Beidokhti | |
| 6,773,327 B1 | 8/2004 | Felice et al. | |
| 6,790,398 B1 | 9/2004 | Ejima et al. | |
| 6,805,606 B1 | 10/2004 | Kellum | |
| 6,830,497 B1 | 12/2004 | Lee et al. | |
| 6,929,527 B1 | 8/2005 | Chan | |
| 6,932,669 B2 * | 8/2005 | Lee et al. | 446/375 |
| 7,479,054 B2 | 1/2009 | Wittenberg et al. | |
| 7,537,507 B2 | 5/2009 | Volynsky | |
| 7,695,341 B1 | 4/2010 | Maddocks et al. | |
| 2005/0191936 A1 | 9/2005 | Marine | |
| 2006/0089079 A1 | 4/2006 | Enku | |
| 2008/0194176 A1 | 8/2008 | Pennington | |
| 2010/0035510 A1 | 2/2010 | Joubert | |

FOREIGN PATENT DOCUMENTS

| | | | |
|---|---|---|---|
| DE | 928751 | | 6/1955 |
| GB | 1489458 | | 10/1977 |
| GB | 1489458 A | * | 10/1977 |
| JP | 49-018954 | | 5/1972 |
| JP | 49-018955 | | 2/1974 |
| JP | 60-097067 | | 7/1985 |
| JP | 61-094090 | | 6/1986 |
| JP | 61-094091 | | 6/1986 |
| JP | 61-094092 | | 6/1986 |
| JP | 62-053686 | | 3/1987 |
| JP | 62-164092 | | 10/1987 |
| JP | 63-103685 | | 7/1988 |
| JP | 05168772 | | 7/1993 |
| JP | 11-221369 | | 8/1999 |
| WO | 99/08764 | | 2/1999 |
| WO | 00/10665 | | 3/2000 |
| WO | 00/67869 | | 11/2000 |
| WO | 01/08776 | | 2/2001 |
| WO | 2004/069361 | | 8/2004 |

OTHER PUBLICATIONS

German Patent and Trademark Office, Office Action for German Application No. 102012106595.0, Mar. 23, 2013, 10 pages.

Canadian Intellectual Property Office, Office Action for Canadian Application No. 2,783,391, Dec. 4, 2013, 2 pages.

State Intellectual Property Office of the People's Republic of China, Office Action for Chinese Application No. 201210253404.2, Apr. 1, 2014, 20 pages.

The Patent Office of the People's Republic of China, Office Action for Chinese Patent Application No. 2014121801427920, Dec. 23, 2014, 8 pages.

Instituto Mexicano de la Propiedad Industrial, Office Action for Mexican Patent Application No. MX/a/2012/008421, Jul. 18, 2014, 5 pages.

* cited by examiner

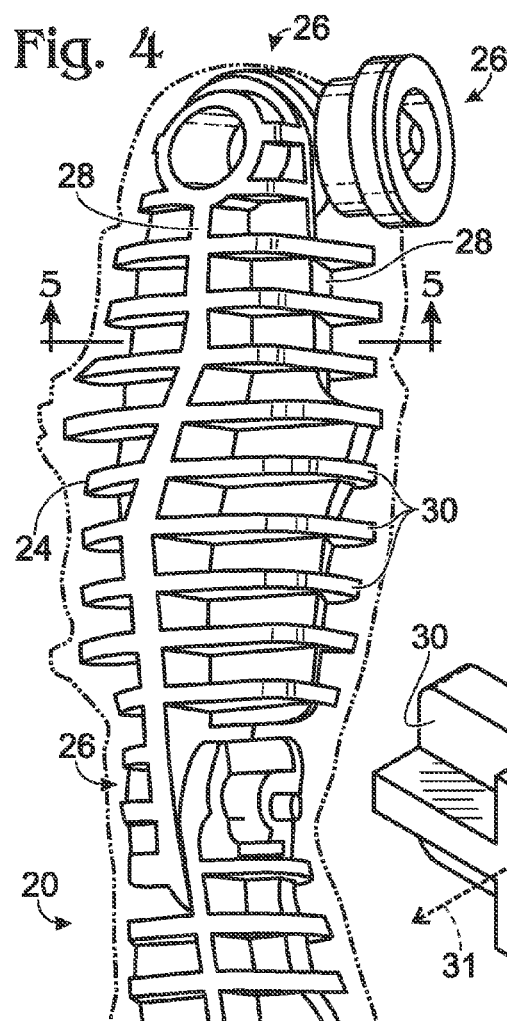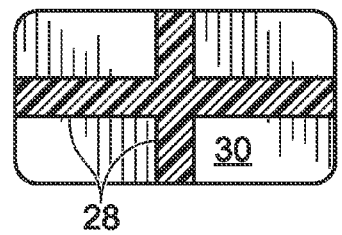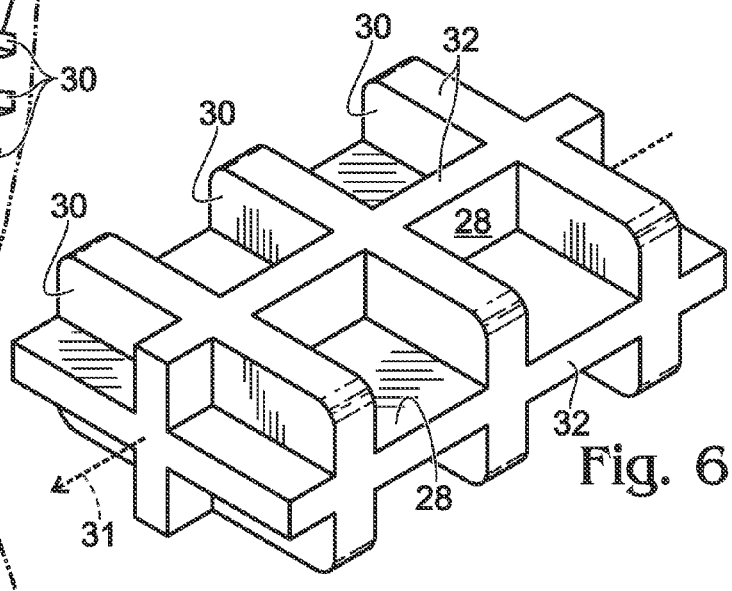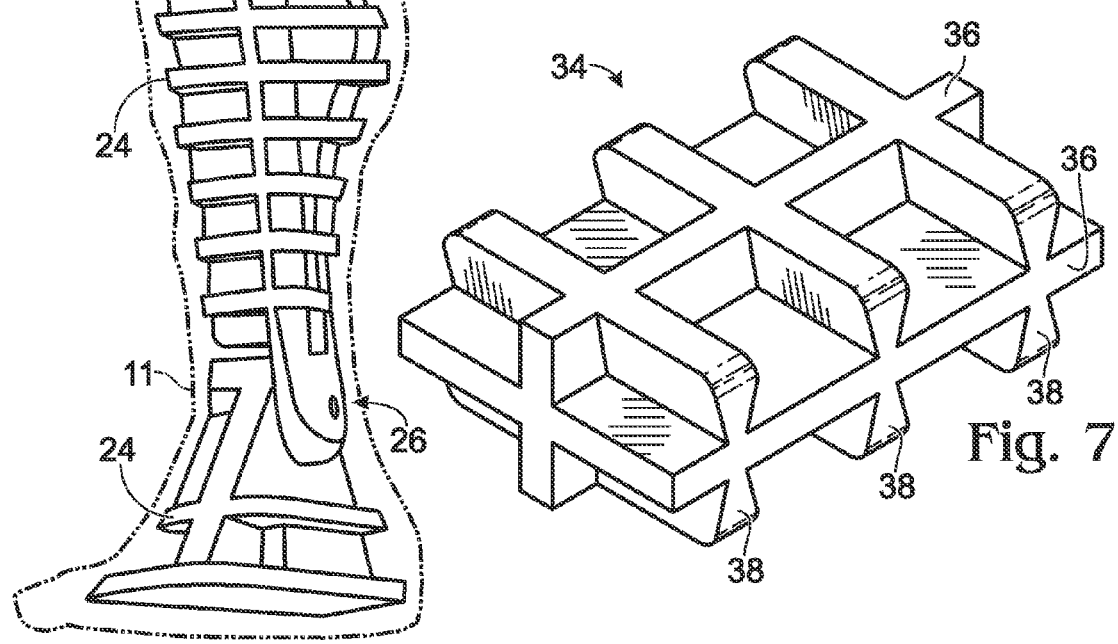

Fig. 8

```
┌──────────────────────────────────────────┐ /-42
│ INJECTION MOLDING A PLURALITY OF RIGID   │
│ POLYMER ARMATURE LIMB SEGMENTS THAT EACH │
│ INCLUDE TWO LONGITUDINAL PRIMARY PLATES  │
│ INTERSECTING APPROXIMATELY ORTHOGONALLY  │
│ AND A PLURALITY OF SUBSTANTIALLY PARALLEL│
│ SECONDARY PLATES THAT INTERSECT WITH AND │
│ ARE APPROXIMATELY ORTHOGONAL TO BOTH     │
│                PRIMARY PLATES            │
└──────────────────────────────────────────┘
```

```
┌──────────────────────────────────────────┐ /-44
│    ASSEMBLING A PLURALITY OF ARTICULATED │
│      LIMB MEMBERS BY CONNECTING A        │
│    PLURALITY OF ARMATURE LIMB SEGMENTS   │
│          VIA ARTICULATED JOINTS          │
└──────────────────────────────────────────┘
```

```
┌──────────────────────────────────────────┐ /-46
│ ASSEMBLING AN ARTICULATED ARMATURE THAT  │
│    INCLUDES A TORSO MEMBER AND MULTIPLE  │
│  ARTICULATED LIMB MEMBERS CONNECTED TO   │
│  THE TORSO MEMBER BY ARTICULATED JOINTS  │
└──────────────────────────────────────────┘
```

```
┌──────────────────────────────────────────┐ /-48
│ INSERT MOLDING A FLEXIBLE POLYMER SKIN TO│
│   ENCAPSULATE THE ASSEMBLED ARTICULATED  │
│   ARMATURE, SO THAT THE SHAPE AND VOLUME │
│   OF EACH LIMB IS SUBSTANTIALLY DEFINED BY│
│      THE OUTER EDGES OF THE PRIMARY AND  │
│   SECONDARY PLATES OF THE CORRESPONDING  │
│                LIMB SEGMENTS             │
└──────────────────────────────────────────┘
```

US 9,028,292 B2

FLEXIBLE TOY FIGURE WITH ARMATURE

CROSS-REFERENCE TO RELATED APPLICATIONS

The present application claims the benefit of the filing date under 35 U.S.C. §119(e) of U.S. Provisional Patent Application Serial No. 61/510,032, entitled FLEXIBLE TOY FIGURE WITH ARMATURE, filed Jul. 20, 2011; which is hereby incorporated by reference in its entirety for all purposes.

TECHNICAL FIELD

The present disclosure relates generally to posable doll toys and action figure toys, including dolls and action figures possessing an internal support structure. More particularly, the disclosure relates to posable toy figures having a soft and resilient body material that encapsulates and is supported by an inner articulated armature.

BACKGROUND OF THE DISCLOSURE

Many different varieties of flexible and/or posable dolls and action figures have been developed over the years, mainly for the purposes of entertainment and display. Creation of a flexible or posable figure generally requires creation of a movable articulated body and limbs, ideally configured to retain whatever pose the figure is placed into. Furthermore, it is desirable that the figure be posable a large number of times without failure of the structure.

One class of posable figures includes an inner armature or skeleton including joints to recreate the articulation of a human skeleton, and a molded outer covering or body constructed of a flexible material that surrounds and is bonded or otherwise anchored to the inner armature. Examples of flexible doll toys and action figure toys are found in U.S. Pat. Nos. 164,582, 280,986, 1,189,585, 1,551,250, 1,590,898, 1,189,585, 1,347,993, 1,590,898, 1,595,203, 1,626,533, 2,017,023, 2,073,723, 2,109,422, 2,129,421, 2,134,974, 2,174,932, 2,202,805, 2,392,024, 2,601,740, 2,669,063, 2,684,503, 3,055,119, 3,265,257, 3,277,601, 3,325,939, 3,277,601, 3,284,947, 3,325,939, 3,350,812, 3,394,490, 3,395,484, 3,555,723, 3,557,471, 3,624,691, 3,628,282, 3,699,714, 3,706,330, 3,716,942, 3,731,426, 3,837,008, 3,955,309, 4,123,872, 4,136,484, 4,197,358, 4,233,775, 4,279,099, 4,470,784, 4,738,647, 4,932,919, 4,954,118, 4,964,836, 4,968,282, 5,017,173, 5,257,873, 5,297,443, 5,474,485, 5,516,314, 5,620,352, 5,630,745, 5,664,983, 5,762,531, 5,800,242, 5,800,243, 5,989,658, 6,074,270, 6,110,002, 6,126,509, 6,139,328, 6,155,904, 6,170,721, 6,217,406, 6,220,922, 6,494,763, 6,685,533, 6,746,303, 6,773,327, 6,790,398, 6,805,606, 6,830,497, 6,929,527, 6,932,669, 7,479,054, 7,537,507, and 7,695,341, and in publications AT332178T, AU5143600A, BR0012818A, BRPI00128180A1, CA2372913A1, DE60029226D1, DE60029226T2, DE928751C, EP1200164A1, EP1200164A4, EP1200164B1, JP49-18954, JP49-18955, JP60-97067, JP61-94090, JP61-94091, JP61-94092, JP62-53686, JP62-164092, JP63-103685, JP05-168772A, JP11-221369, MXPA01011419A, US20050191936, US20080194176, US20100035510, WO9908764, WO0067869, WO0010665, WO0108776, and WO2004069361. The disclosures of all of these patents and publications are incorporated herein by reference.

SUMMARY OF THE DISCLOSURE

In one example, the invention may include a toy figure that incorporates an articulated armature, where the armature includes a torso member and multiple limbs, each limb being the same or different, and each limb including at least one limb segment. Each limb segment is formed by two longitudinal primary plates that intersect approximately orthogonally, and a plurality of substantially parallel secondary plates that intersect with and are approximately orthogonal to both primary plates. The outer edges of the primary and secondary plates of each limb segment substantially define the shape and volume of that limb portion of the toy figure. The articulated armature is surrounded by a resilient body material to simulate flesh.

In another example, the invention may include an armature limb segment for a toy figure, where the armature limb segment includes two intersecting primary plates, each primary plate extending longitudinally along the limb segment and intersecting at approximately right angles, and a plurality of secondary plates that are disposed along and intersect with the primary plates. As a result, the secondary plates are oriented substantially parallel to one another, and at approximate right angles to each of the intersecting primary plates.

In yet another example, the invention may include a limb for a toy figure, the limb including an armature limb segment that includes a plurality of plates disposed transverse to a long axis of the limb segment and generally parallel to one another, so that the plates are spaced along the long axis of the limb segment, and the spacing between adjacent plates is less than five times the average thickness of the plates. The limb further includes a plastic material that is disposed upon and encases the armature limb segment, to provide the toy figure with simulated flesh.

In yet another example, the invention may include an articulated limb for a toy figure, including at least two armature limb segments joined by an articulated joint, each armature limb segment formed by a plurality of parallel walls transverse to the primary axis of the limb segment, such that outer edges of the parallel walls substantially define the overall contour for that limb segment. A plastic material encases the armature limb segments to serves as simulated flesh, where the plastic material is sufficiently resilient to permit the articulated joint to be flexed.

The invention may further include a method of manufacturing a toy figure, where the method may include includes injection molding a plurality of rigid polymer armature limb segments, where each molded armature limb segment includes two longitudinal primary plates intersecting approximately orthogonally and a plurality of substantially parallel secondary plates that intersect with and are approximately orthogonal to both primary plates; assembling a plurality of articulated limb members by connecting a plurality of armature limb segments via articulated joints; assembling an articulated armature that includes a torso member and multiple articulated limb members connected to the torso member by articulated joints; and insert molding a flexible polymer skin onto the assembled articulated armature such that the flexible polymer skin encapsulates the articulated armature, and the shape and volume of each resulting limb is substantially defined by the outer edges of the primary and secondary plates of the limb segments incorporated in that limb.

BRIEF DESCRIPTION OF THE DRAWINGS

FIG. 4 depicts a leg member of the armature of the exemplary toy figure of FIG. 1. The outer skin of the leg is depicted as a dashed outline.

FIG. 5 depicts a cross-sectional view of an upper leg armature limb segment of the exemplary toy figure of FIG. 1, as indicated in FIG. 4.

FIG. 6 depicts a schematic representation of a portion of an exemplary armature limb segment according to an embodiment of the invention.

FIG. 7 depicts a schematic representation of a portion of an exemplary armature limb segment according to an alternative embodiment of the invention.

FIG. 8 depicts a flowchart setting out a method of manufacturing a toy figure, according to an exemplary embodiment of the present invention.

DESCRIPTION OF PREFERRED EMBODIMENTS

The toy figures of the present disclosure incorporate an articulated armature. Such armatures serve as an internal framework, or skeleton, for a toy figure, and typically support and anchor the material used to form the skin of the figure. By incorporating points of articulation, the armature may permit the toy figure to be flexed and/or posed. The skin, therefore, must also possess sufficient flexibility to accommodate the movement of the internal armature while remaining resilient enough to avoid damage. A skin material that is too compliant, however, may split under stress or even separate from the armature. In addition, polymer compositions exhibiting these desired characteristics may be relatively costly, and so the toy figure should be designed to minimize the amount of skin material that may be required.

The internal armatures and armature components of the present invention advantageously secure and retain overlying skin materials, even where the overlying skin is quite soft, while at the same time filling a substantial amount of the internal volume of the figure, minimizing the amount of skin material that may be required for a given figure.

Figure 1:
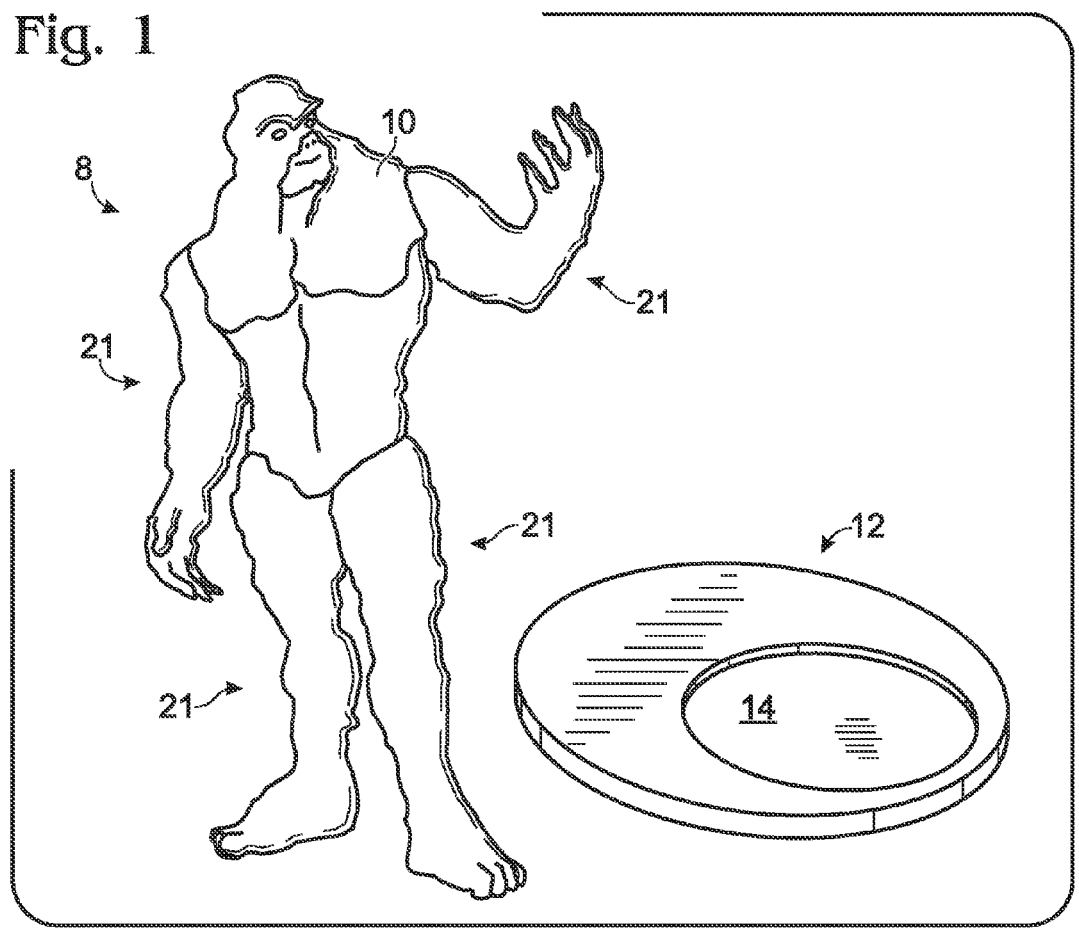
FIG. 1 depicts a toy figure, according to an exemplary embodiment of the present invention.

A toy FIG. 8 according to an example of the present invention is depicted in FIG. 1. Toy FIG. 8 is substantially completely covered by a polymer skin 10. The polymer skin 10 acts as both the outer surface of the toy figure, as well as making up the portion of the internal volume of the toy figure that is not occupied by an internal armature.

Toy FIG. 8 may be an action figure, and may represent or resemble a well-known and/or a licensed character, such as a superhero, good-guy, villain, television personality, comic book character, or the like. As illustrated in FIG. 1, the action figure may be configured to represent the SWAMP THING, a DC COMICS character.

The toy FIG. 8 may be accompanied by, made available in combination with, and/or configured to be compatible with one or more accessories 12. Typically, toy figure accessories share a theme or other connection with the character depicted by the toy figure. Suitable accessories may include without limitation, weapons such as guns, knives or swords; tools such as shovels, hammers, drivers; electronic devices such as radios, telephones, computers, sensors; defensive devices such as shields, and armor; and/or more generic objects such as boulders, furniture, vehicles, and trees; among other possible accessories. In one aspect of the invention, the toy figure may be provided with an accessory that functions as a decorative stand 14.

Figure 2:
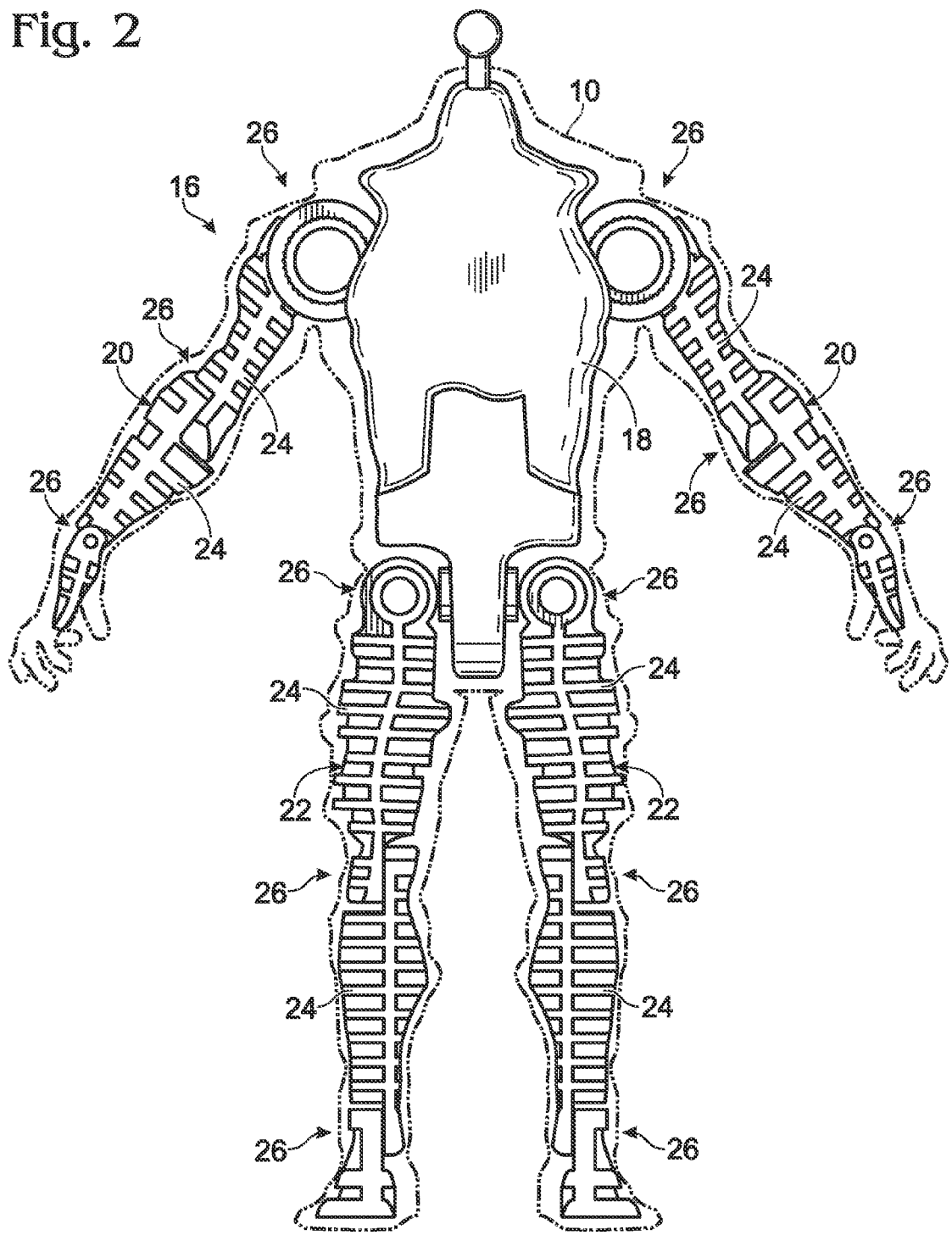
FIG. 2 depicts the internal armature of the body of the exemplary toy figure of FIG. 1. The outer skin of the toy figure is depicted as a dashed outline.

As illustrated in FIG. 2, toy FIG. 8 includes an internal articulated armature 16 beneath the polymer skin 10 (as indicated by a dashed outline). Armature 16 typically includes a torso member 18 and one or more limb members 20, where each limb may be the same or different. The head of toy FIG. 8 is omitted for the sake of clarity. In one embodiment of the invention, the armature 16 may include a head member that is coupled to torso member 18 via an articulated joint.

Where the toy figure represents a human or humanoid figure, it typically features four limbs 21 corresponding to the arms and legs of the depicted character. The internal armature of such a toy figure would necessarily also includes four limb members 20, corresponding to two arms and two legs, as shown for toy FIG. 8 in FIG. 2. However, the internal armature of the present invention may be readily adapted for use in combination with a toy figure having more are fewer than four limbs, where the limbs may be selected from arms, legs, tentacles, tails, etc. without limitation.

Figure 3:
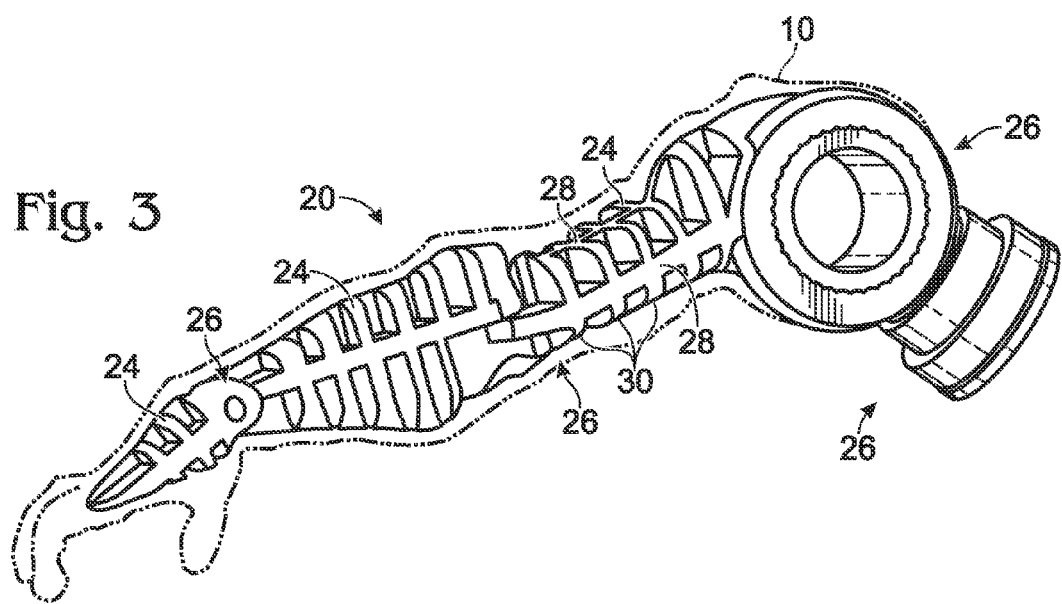
FIG. 3 depicts an arm member of the armature of the exemplary toy figure of FIG. 1. The outer skin of the arm is depicted as a dashed outline.

As illustrated in FIGS. 2, 3, and 4, each limb member 20 may include one or more armature limb segments 24. Where a limb member 20 includes two or more limb segments 24, the limb segments are typically coupled or interconnected in series. That is, the limb segments 24 are attached in a generally linear arrangement, disposed end-to-end, each coupled to the adjacent limb segment(s) by an articulated joint 26, also referred to as a point of articulation. For example, an arm member may include an upper arm limb segment, a lower arm limb segment, and a hand limb segment, each coupled to the adjacent limb segment by an articulated joint, as shown in FIG. 3. Similarly, a leg member may include an upper arm limb segment, a lower leg limb segment, and a foot limb segment, each coupled to the adjacent limb segment by an articulated joint, as shown in FIG. 4.

The limb members 22 of the articulated armature are typically connected to torso member 18 via a point of articulation 26. These points of articulation are typically located appropriately for the joint they are intended to represent. Similarly, the points of articulation may exhibit the appropriate type and range of motion appropriate for the joint they are intended to represent, such as a shoulder joint, hip joint, elbow, knee, or other joint.

More specifically, where the represented joint is a shoulder joint, the appropriate articulated joint 26 may incorporate a ball-and-socket joint; where the represented joint is an elbow, the appropriate articulated joint 26 may incorporate a hinge; etc. Alternatively, toy FIG. 8 may incorporate a different number or different types of joints than may occur in nature, for example in order to confer a set of desired movement characteristics on the represented character, or to enhance the quality of play possible with the toy figure.

Each armature limb segment 24 is typically constructed so as to emphasize the rigidity and stability of the limb segment. Furthermore, each limb segment 24 may be constructed so that when combined into an armature limb member 20, the limb member 20 defines a desired shape and volume for the corresponding limb 21. By utilizing an armature 16 having an underlying contoured support structure defining a desired final shape, the resulting toy figure may exhibit a more lifelike feel and appearance after application of the polymer skin 10.

More specifically, each armature limb segment 24 may incorporate two primary plates 28 that each extend along the length of that limb segment. As used herein, a plate is a generally rigid structure or component that is substantially smooth, substantially planar, and relatively thin. That is, the thickness of a plate is significantly less than either its width or depth, which may be the same or different.

The primary plates 28 of limb segment 24 may be disposed at an angle to one another, so that the plates intersect along the length of the limb segment. Typically, the two primary plates are approximately orthogonal to one another. That is, they meet at an angle of about 90 degrees, exhibiting a generally cruciform cross-section, as depicted in FIG. 5. Each of the primary plates 28 is typically oriented so that the long axis of the plate extends longitudinally along the limb segment. As a result, the line of intersection of the two primary plates also extends generally longitudinally along the limb segment.

Additionally, each armature limb segment includes a plurality of secondary plates 30, disposed along the length of the limb segment transverse to the long axis of the limb segment. The secondary plates 30 are typically arrayed so that each secondary plate is substantially parallel to each other secondary plate on that limb segment, and so that the plane of each secondary plate is substantially orthogonal to each of the intersecting primary plates 28. the secondary plates 30 can be considered as forming a stack along the length of the limb segment that includes them.

The secondary plates 30 may be evenly spaced along the limb segment, or unevenly spaced along the limb segment. Typically, the secondary plates 30 are substantially regularly spaced along the limb segment, with the separation between adjacent secondary plates being about 1 to about 5 times the thickness of the secondary plates.

The typical physical and spatial relationship between the primary and secondary plates is illustrated in FIG. 6 by way of a partial schematic view of an exemplary limb segment according to an embodiment of the invention. In the schematic of FIG. 6, primary plates 28 are disposed parallel to a longitudinal axis of the limb segment 24, and intersect at an angle of approximately 90 degrees. Secondary plates 30 are disposed along the primary plates so that the plane of each secondary plate 30 is orthogonal to (at right angles to) both primary plates, and is substantially perpendicular to the longitudinal axis 31 of the limb segment.

This interlocked and mutually orthogonal arrangement of the primary and secondary plates confers significant solidity and rigidity onto the resulting armature limb segment 24. By preparing the limb segments from a relatively stiff or rigid polymer composition, the resulting armature limb segments may exhibit very little bending or deformation when stressed.

In another aspect of the present invention, the primary and secondary plates 28, 30 of the disclosed limb segments 24 are shaped so that the outer edges 32 of the primary and secondary plates of a limb segment 24 define a three-dimensional contour that provides a shape and a volume for the corresponding limb. As shown in FIGS. 2-4, the shape and volume of the limbs 21 of toy FIG. 8 are substantially determined by the outline of the underlying armature 16. The soft polymer composition 11 provides only minor additional structure to the shape and size of the toy figure.

When handled and manipulated by a user, the combination of armature construction and overlying soft polymer composition results in a surface for toy FIG. 8 that yields to pressure, while the underlying alternating structure of rigid plates interleaved with soft polymer resists compression. The resulting complex tactile profile confers a more lifelike and realistic texture to the toy figure, enhancing the playing experience for the user.

In addition to the positive tactile effects resulting from the use of the disclosed articulated armature, the mutually orthogonal plate structure of the armature limb segments promotes the binding between the armature and the soft polymer composition used to encapsulate the armature. The enhanced binding may be due to the liquid polymer precursor being forced into the many internal cavities and channels created within the armature during insert molding. Upon curing, the resulting solid polymer is tightly interlocked with the underlying armature structure, and strongly resists removal.

In another aspect of the invention, this interlocking effect between the polymer skin and the underlying armature structure may be enhanced by increasing the thickness of secondary plates near the edges of those plates. That is, the thickness of the secondary plates may be systematically varied, so that the plate thickness increases along one or more edges of the plate. Where plate thickness increases across the entire secondary plate, the result is a wedge-shaped secondary plate. Alternatively, thickness of the secondary plate may be increased with distance from the intersection of the secondary plate with one of the primary plates, resulting in a double wedge-shaped plate. In yet another embodiment, the plate thickness of the secondary plate increases at the outer edges of the secondary plate, leaving it relatively thinner in the center region of the plate. In yet another embodiment, the thickness of the secondary plates may increase as a function of proximity to the distal end of that limb segment.

The schematic depiction of FIG. 7 provides a partial view of a limb segment 34 having primary plates 36 and secondary plates 38. In the embodiment of FIG. 7, the thickness of secondary plates 38 increases as a function of the distance from the intersection of secondary plate 38 with the horizontally disposed primary plate 36, resulting in double wedge-shaped secondary plates 38, having opposing plate edges that are increased in thickness. This double-wedge conformation may permit the soft polymer composition to anchor even more securely to the underlying articulated armature.

It should be appreciated that the toy figures of the present invention may be configured to perform any of a variety of motions, including but not limited to, twisting at the torso, bowing at the waist, bending backward, turning the head, bringing the legs together, spreading the legs apart, and raising one or both arms.

Alternatively, or in addition, the toy figures of the present invention may be configured to emit prerecorded or electronically generated sounds, such as music samples, recorded or synthesized speech, or other sound effects that may be characteristic of the character depicted by the toy figure.

The various components of the toy figures of the present invention (and their accessories, if present) may be fabricated from any suitable material, or combination of materials, such as plastic, foamed plastic, wood, cardboard, pressed paper, metal, or the like. Suitable materials may be selected to provide a desirable combination of weight, strength, durability, cost, manufacturability, appearance, safety, and the like. Suitable plastics may include thermoplastic resins. Additional suitable plastics include high-density polyethylene (HDPE), low-density polyethylene (LDPE), polystyrene, acrylonitrile butadiene styrene (ABS), polycarbonate, polyethylene terephthalate (PET), polypropylene, or the like. Suitable foamed plastics may include expanded or extruded polystyrene, or the like.

The disclosed toy figures may be manufactured using an insert molding process, where an articulated armature as described above is assembled, typically by coupling individual members prepared by injection molding using a hard plastic, such as a thermoplastic resin. The articulated armature may then be placed in a mold, and a softer plastic injected into the mold to surround the articulated armature. The armature may incorporate one or more features to keep it centered in the mold, so that the soft plastic may encapsulate the articulated armature completely. Although the softness of the two plastics used during insert molding may differ, the hard and soft polymer materials may be selected so that during the insert molding process they bond tightly to each other.

An exemplary method of manufacturing a toy figure according to the present invention is depicted in flowchart 40 of FIG. 8. The flowchart includes injection molding a plurality of rigid polymer armature limb segments at 42, where each molded armature limb segment includes two longitudinal primary plates intersecting approximately orthogonally and a plurality of substantially parallel secondary plates that intersect with and are approximately orthogonal to both primary plates; assembling a plurality of articulated limb members by connecting a plurality of armature limb segments via articulated joints at 44; assembling an articulated armature that includes a torso member and multiple articulated limb members connected to the torso member by articulated joints at 46; and insert molding a flexible polymer skin onto the assembled articulated armature such that the flexible polymer skin encapsulates the articulated armature, and the shape and volume of each resulting limb is substantially defined by the outer edges of the primary and secondary plates of the limb segments incorporated in that limb at 48.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A toy figure, comprising:
   an articulated armature including a torso member and multiple limbs, where each limb may be the same or different, and each limb includes at least one limb segment;
   wherein each limb segment includes two longitudinal primary plates that intersect approximately orthogonally;
   a plurality of substantially parallel secondary plates that intersect with and are approximately orthogonal to both primary plates, thereby defining many internal cavities and channels within the limb segments; and
   a resilient body that encloses the articulated armature;
   wherein the outer edges of the primary and secondary plates of each limb segment substantially define a shape and a volume for a corresponding limb portion of the toy figure; and
   wherein the resilient body extends into the internal cavities and channels within the limb segment and tightly interlocks with the articulated armature, such that the resilient body binds to the articulated armature and strongly resists removal.

2. The toy figure of claim 1, wherein each limb of the armature includes at least two limb segments connected by an articulated joint.

3. The toy figure of claim 1, wherein the torso member of the armature is rigid or semi-rigid; and each limb is connected to the torso member by an articulated joint.

4. The toy figure of claim 3, wherein each limb of the armature includes a distal hand segment or a distal foot segment that is connected to the limb by an articulated joint.

5. The toy figure of claim 1, wherein the armature includes a head segment that is connected to the torso member by an articulated joint.

6. The toy figure of claim 1, wherein each armature limb segment is substantially rigid.

7. The toy figure of claim 1, wherein the secondary plates are substantially equally spaced along at least one of the limb segments.

8. The toy figure of claim 1, wherein a plurality of the secondary plates have a nonuniform plate thickness.

9. The toy figure of claim 8, wherein the nonuniform plate thickness varies along one dimension of the secondary plates.

10. The toy figure of claim 9, wherein for a plurality of the secondary plates the nonuniform plate thickness increases at an outer edge of the secondary plate.

11. The toy figure of claim 9, wherein for a plurality of the secondary plates, the nonuniform plate thickness increases with a distance from an intersection with a primary plate.

12. The toy figure of claim 10, wherein the increased plate thickness of the secondary plates enhances a retention of the surrounding resilient body.

13. The toy figure of claim 1, where for a plurality of the secondary plates, a ratio of secondary plate thickness to a separation width between adjacent secondary plates is about 1:1 to about 1:5.

14. The toy figure of claim 1, wherein the primary and secondary plates include circumferential plate edges that in combination define an outer shape and volume appropriate for an upper arm segment, a lower arm segment, an upper leg segment, or a lower leg segment of the toy figure.

* * * * *